United States Patent [19]

Roberts

[11] Patent Number: 4,676,330
[45] Date of Patent: Jun. 30, 1987

[54] AUXILIARY PROPULSION SYSTEM ON TRAILER

[76] Inventor: Jerry G. Roberts, 8406 NW. 2nd St., Coral Springs, Fla. 33065

[21] Appl. No.: 856,058

[22] Filed: Apr. 25, 1986

Related U.S. Application Data

[63] Continuation-in-part of Ser. No. 722,604, Apr. 12, 1985, abandoned.

[51] Int. Cl.⁴ .............................................. B60D 1.14
[52] U.S. Cl. .................................. 180/14.2; 180/65.6
[58] Field of Search ............... 180/10, 14.2, 14.3, 180/65.1, 65.6; 280/414.1; 74/329, 350

[56] References Cited

U.S. PATENT DOCUMENTS

| | | | |
|---|---|---|---|
| 656,389 | 8/1900 | Collins | 180/65.6 |
| 1,844,240 | 2/1932 | Brisson | 180/14.2 |
| 2,630,871 | 3/1953 | Simpkins | 180/14.2 |
| 3,027,959 | 4/1962 | Mailliard | 180/22 |
| 3,094,186 | 6/1963 | Lappin et al. | 180/10 X |
| 3,447,815 | 6/1969 | West | 280/144 |
| 3,497,026 | 2/1970 | Calvert | 180/65 |
| 3,705,638 | 12/1972 | Shock | 180/14 A |
| 3,783,960 | 1/1974 | Feliz | 180/14 A |
| 4,088,202 | 5/1978 | Costello | 182/13 |
| 4,106,583 | 8/1978 | Nemeth | 180/65 |

*Primary Examiner*—John J. Love
*Assistant Examiner*—Michael Mar
*Attorney, Agent, or Firm*—Oltman and Flynn

[57] ABSTRACT

An auxiliary propulsion system on a boat trailer having a fixed frame and a displaceable frame that is slidably adjustable along the fixed frame. The fixed frame rotatably supports ground-engaging wheels on opposite sides of the trailer, each having a chain on the inside of its rim. The displaceable frame supports a pair of electric motors at the front end of the trailer driving a pair of longitudinal drive shafts through gear reductions and slip clutches. The longitudinal drive shafts drive respective transverse drive shafts with pinions on their outer ends for driving engagement with the chains on the wheels. A handle on the front end of the trailer is coupled to the displaceable frame through a mechanical linkage for selectively positioning the displaceable frame along the fixed frame to put the pinions in or out of driving engagement with the wheel chains.

15 Claims, 13 Drawing Figures

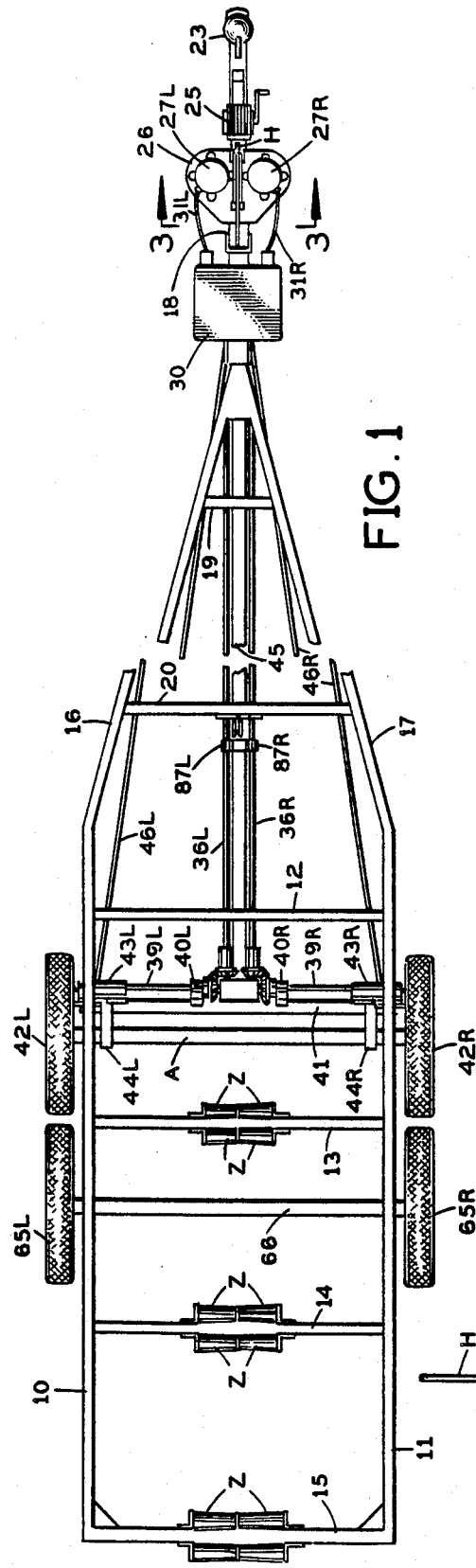
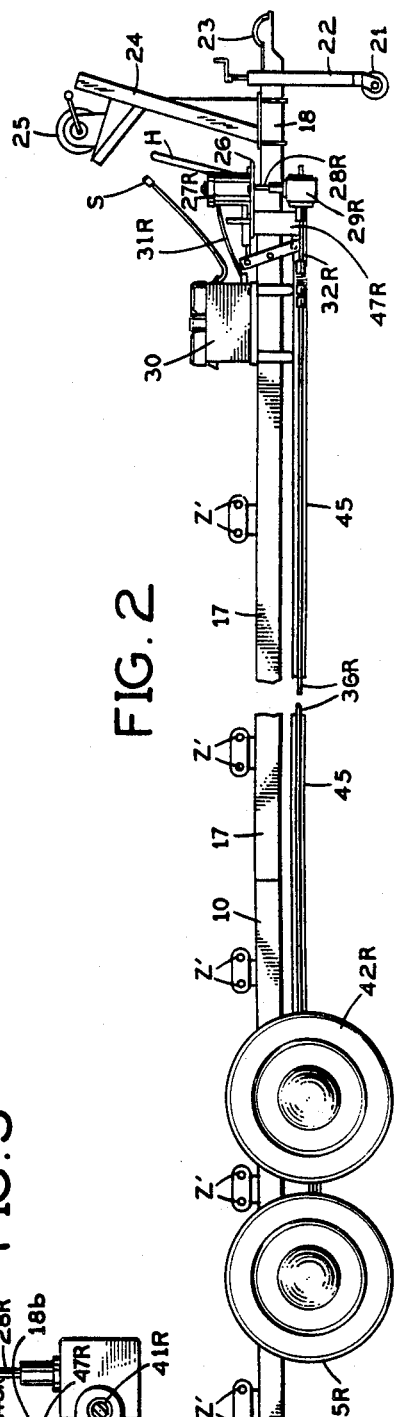
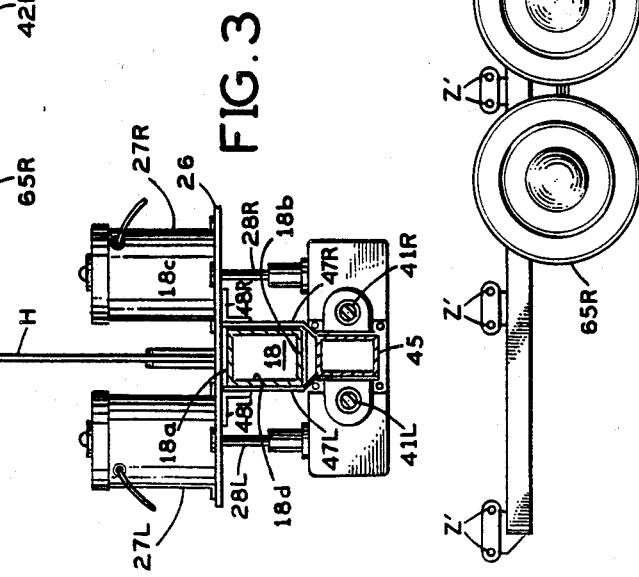
FIG. 1
FIG. 2
FIG. 3

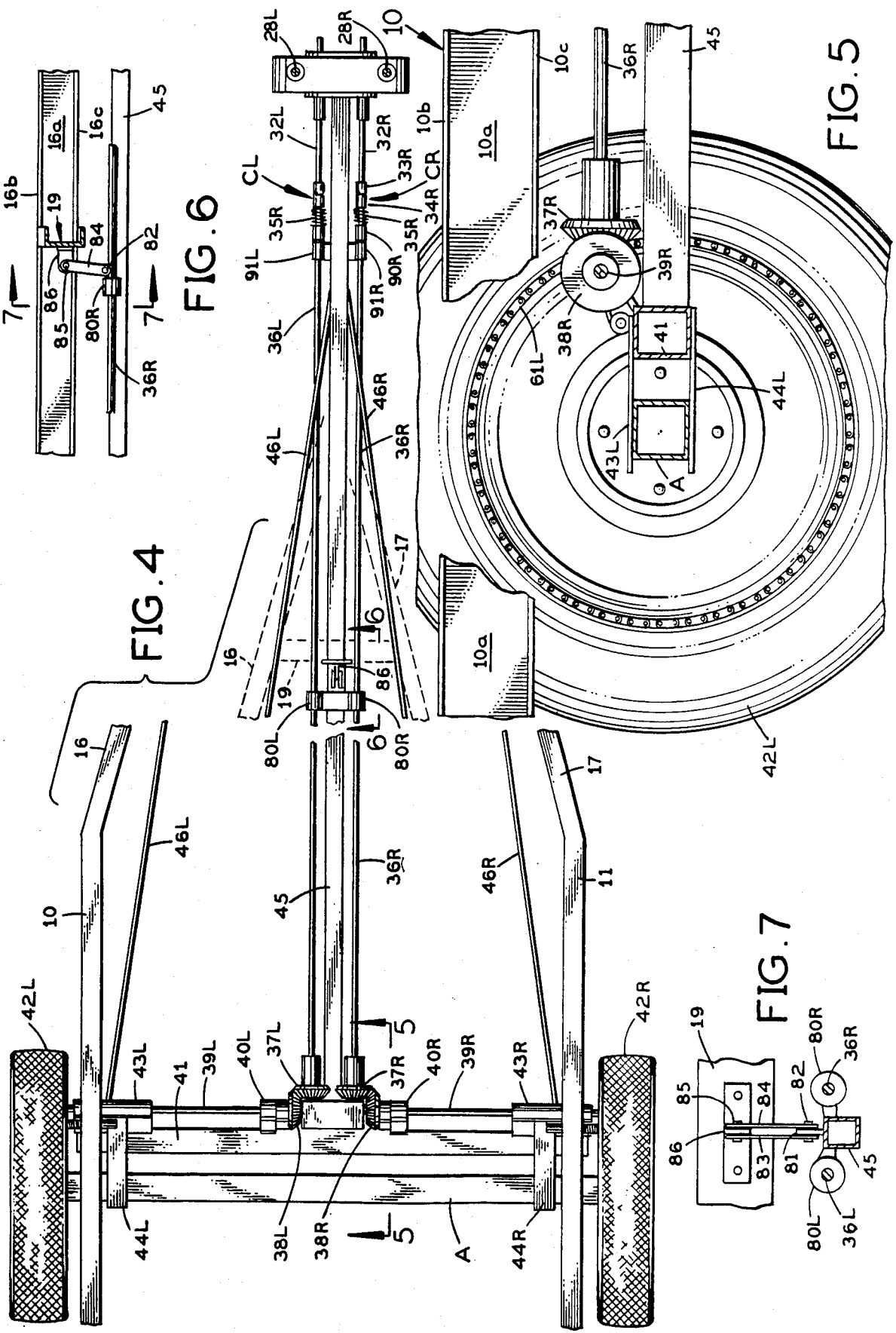

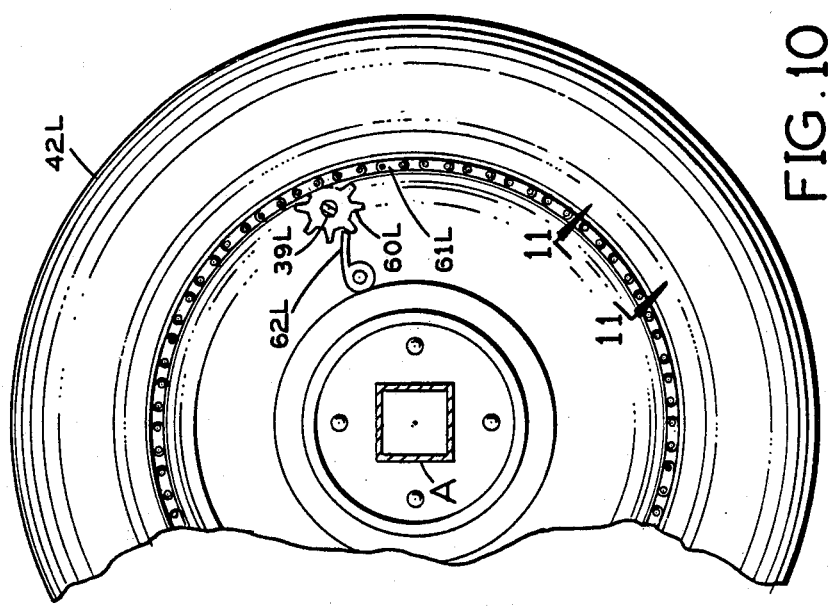
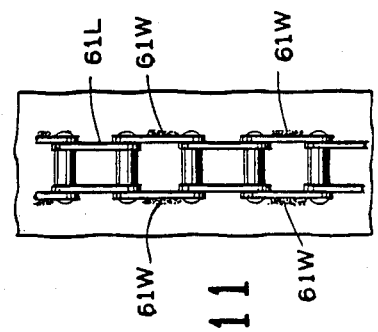
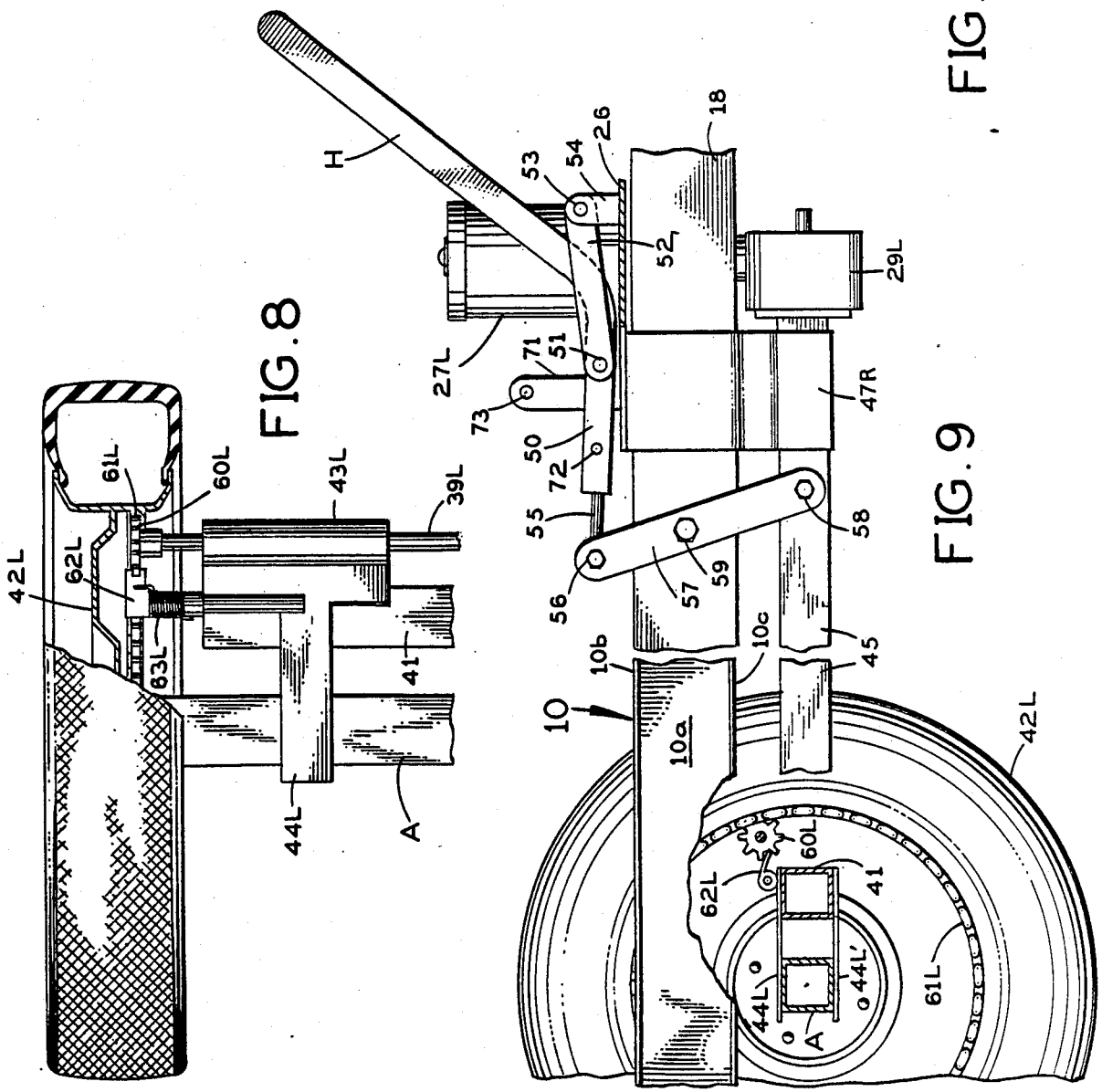

AUXILIARY PROPULSION SYSTEM ON TRAILER

CROSS-REFERENCE TO RELATED APPLICATION

This application is a continuation-in-part of my co-pending U.S. patent application Ser. No. 722,604, filed Apr. 12, 1985 now abandoned, for Auxiliary Propulsion System For Trailer.

SUMMARY OF THE INVENTION

This invention relates to an auxiliary propulsion system on a trailer, such as a boat trailer.

Various boat trailers in use today are detachably coupled to a pulling vehicle, such as a passenger car, van or truck, which pulls the trailer to and from the body of water where the boat on the trailer is used. However, sometimes it is difficult to move the trailer, with the boat on it, up the launching ramp and out of the water. It would be desirable to have auxiliary power to assist the pulling vehicle in pulling the trailer and boat up the ramp.

The present invention is directed to an auxiliary propulsion system on a trailer for use in such situations.

The present propulsion system has a battery-powered electric motor drive for ground-engaging wheels of the trailer. The wheels can be disconnected from this drive when the trailer is being towed, and then operatively connected to this drive when the auxiliary propulsion system is to be used to move the trailer.

Preferably, the trailer has a fixed frame, which rotatably supports the groun-engaging wheels and is releasably connectable at its front end to the towing vehicle, and a displaceable frame, which can be selectively positioned lengthwise of the fixed frame and carries the electric motor drive for the ground-engaging wheels. In one position of the displaceable frame along the fixed frame it holds the electric motor drive disengaged from the wheels and in another position it holds them engaged. Preferably, this drive has a separate battery powered electric motor and drive shaft arrangement for each wheel. Preferably, also, each wheel carries an endless chain on the inside of its rim which is engageable by a pinion on the outer end of a transverse drive shaft carried by the displaceable frame. Preferably, also, the position of the displaceable frame lengthwise of the fixed frame is determined by a mechanical linkage operated by a handle at the front end of the trailer.

A principal object of this invention is to provide a novel auxiliary propulsion system on a trailer, such as a boat trailer, for assisting the towing vehicle in pulling the trailer up a ramp.

Another object of this invention is to provide a novel arrangement on a trailer for selectively connecting and disconnecting the drive to its ground-engaging wheels from a self-contained propulsion system on the trailer.

Another object of this invention is to provide on a trailer a novel arrangement for imparting the drive from an auxiliary propulsion system to a ground-engaging wheel through a rotary pinion in the propulsion system and a chain on the wheel.

Further objects and advantages of this invention will be apparent from the following detailed description of a presently preferred embodiment which is illustrated schematically in the accompanying drawings.

DESCRIPTION OF THE DRAWINGS

FIG. 1 is a top plan view, with parts broken away, of a boat trailer equipped with an auxiliary propulsion system in accordance with this invention;

FIG. 2 is a side elevation of this trailer;

FIG. 3 is a view taken along the vertical cross-section line 3—3 in FIG. 1 near the front end of the trailer;

FIG. 4 is an enlarged top plan view, with certain parts broken open, showing the drives to the rear wheels of the trailer in FIG. 1;

FIG. 5 is a fragmentary vertical longitudinal section taken along the line 5—5 in FIG. 4;

FIG. 6 is a similar view taken along the line 6—6 in FIG. 4;

FIG. 7 is a vertical cross-section taken along the line 7—7 in FIG. 6;

FIG. 8 is an enlarged fragmentary top plan view at one of the wheels of the trailer, with the tire broken away for clarity;

FIG. 9 is an enlarged side elevation of the inner side of one of the trailer wheels and the manual lever on the front end of the trailer positioned to engage the drive to this wheel;

FIG. 10 is an enlarged fragmentary elevation of the inner side of one of the trailer wheels;

FIG. 11 is a view taken along the line 11—11 in FIG. 10 and showing the chain on the inside of the rim of this wheel;

Figures 12, 13:
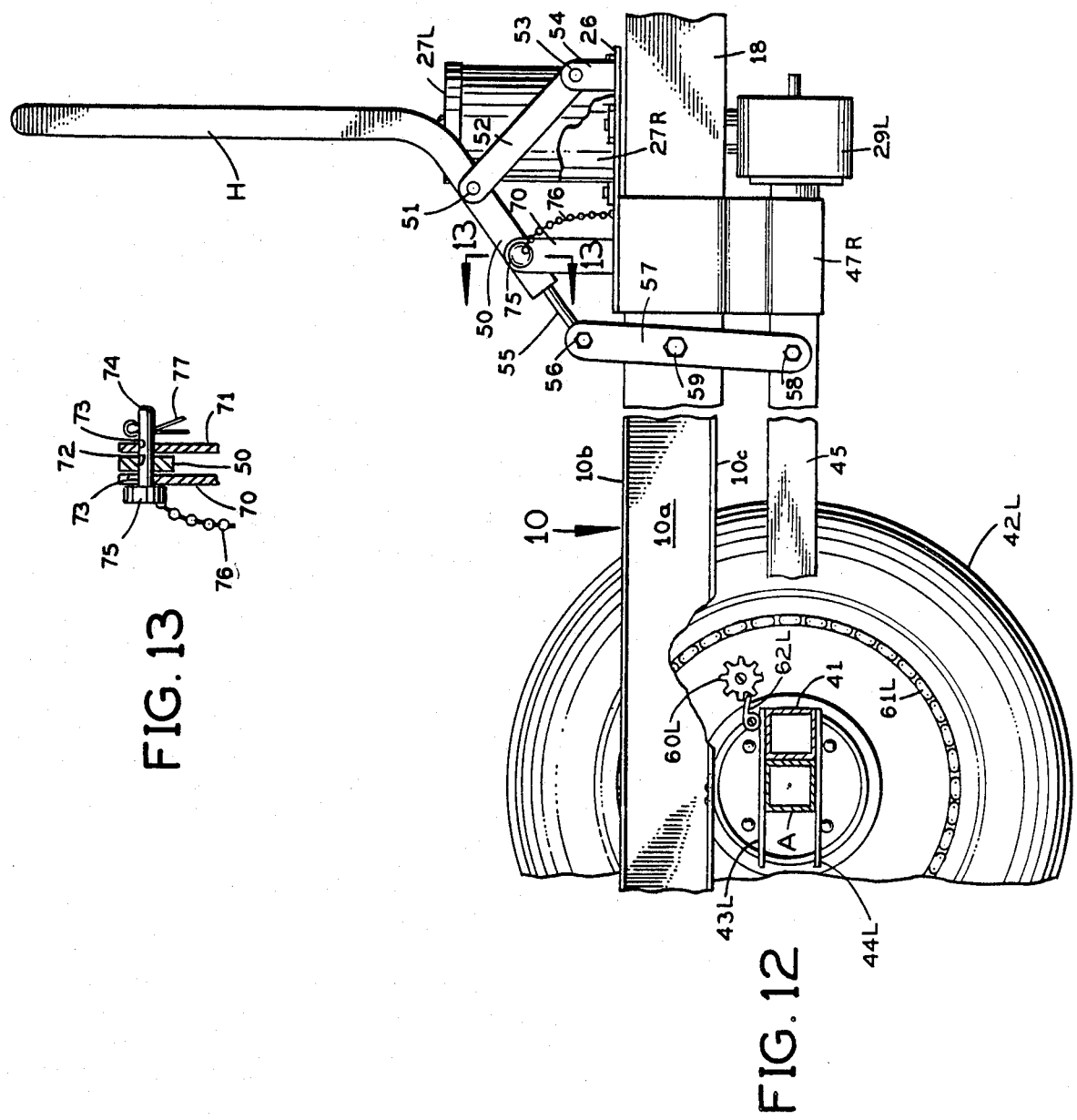
FIG. 12 is a view similar to FIG. 9 and showing the position of the parts when the lever is retracted to disengage the drive to this trailer wheel.
FIG. 13 is an enlarged fragmentary vertical cross-section taken along the line 13—13 in FIG. 12.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

FIG. 1 in part shows a boat trailer with a fixed frame of conventional design which is adapted to be pulled by a self-propelled vehicle, such as a small truck or a passenger car, to and from the site where the boat is to be put in the water. This fixed frame of the trailer is a rigid, open, horizontal, frame with elongated, parallel, opposite rear side rails 10 and 11 interconnected by cross-pieces 12, 13, 14 and 15. In front of the cross-piece 12 the fixed frame presents front side rails 16 and 17 which converge in a forward direction and are joined to a forwardly extending longitudinal front rail 18. The front side rails are interconnected by cross pieces 19 and 20. Each of the side rails 10, 11, 16 and 17 is of channel-shaped cross-section, with a vertical outer wall and inwardly-projecting horizontal top and bottom flanges. This is shown for the rear side rail 10 in FIG. 5, in which 10a designates the vertical outer wall, 10b the top flange, and 10c the bottom flange. Also, it is shown for the front side rail 16 in FIG. 6, with 16a designating the outer wall, 16b the top flange and 16c the bottom flange of this rail. Each of the cross-pieces 12, 13, 14, 15, 19 and 20 is of similar channel-shaped cross-section, as shown for the cross-piece 19 in FIG. 6. The longitudinal front rail 18 is of hollow rectangular cross-section, as shown in FIG. 3, with horizontal top and bottom walls 18a and 18b joined by vertical opposite side walls 18c and 18d.

Each cross-piece 12, 13, 14, 15, 19, and 20 of the fixed frame carries centrally located, rollers Z for engaging the bottom of the boat being towed. (The rollers on cross-pieces 12, 19 and 20 are omitted in FIG. 1 for simplicity). The horizontal axes of these rollers are shown at Z' in FIG. 2. These axes are slightly above the level of the tops of the side rails of the fixed frame.

The trailer has a small front wheel 21 (FIG. 2) swiveled on the lower end of a vertical post 22 extending down from the front rail 18 of the fixed frame. On its front end the front rail 18 of the fixed frame carries a generally hemispherical, downwardly-facing socket 23 for engagement with a complementary ball on the rear of the pulling vehicle.

A post 24 extends upward and forward from the fixed frame at its front end and supports a hand-operated winch 25 with a cable or line (not shown) releasably connected to the bow of the boat on the trailer.

The fixed frame of the trailer includes a non-rotatable horizontal axle A of hollow rectangular cross-section which rotatably supports the rubber-tired drive wheels 42R and 42L of the trailer. Axle A is fixedly attached at its opposite ends to the rear side rails 10 and 11 of the fixed frame. Wheels 42R and 42L are located outside these side rails.

A flat horizontal shelf 26 (FIGS. 1 and 3) is slidably positioned on top of the front rail 18 of the fixed frame of the trailer. Electric motors 27L and 27R are mounted on top of this shelf. These motors have respective downwardly-extending rotary drive shafts 28L and 28R (FIG. 3) which drive corresponding individual gear reductions 29L and 29R. The gear reduction 29R for motor 27R appears in FIG. 2. The gear reduction 29L for motor 27L appears in FIG. 9.

The motors 27L and 27R are energized by respective storage batteries mounted in a box-like enclosure 30 (FIGS. 1 and 2), which is rigidly mounted on top of the longitudinal front rail 18 of the fixed frame of the trailer a short distance behind the motors. Shielded wiring cables 31L and 31R connect each of these batteries to the corresponding motors. The energization of both motors from the respective batteries is controlled by a manually-operated on/off switch S (FIG. 2).

The output of the gear reduction 29R drives a rotary front shaft 32R, which, as shown in FIG. 4, extends horizontally rearward to a slip clutch CR having a toothed drive member 33R engaging a toothed driven member 34R, which is held against it by a coil spring 35R under compression. The driven member 34R of the slip clutch is coupled to the front end of an elongated drive shaft 36R such that it can slide a limited amount along the shaft and they rotate in unison. For example, clutch member 34R may be splined to shaft 36R. Coil spring 35R is engaged between clutch member 34R and an annular collar 90R fixed to shaft 36R. Shaft 36R extends horizontally rearward along the trailer just to the right of its longitudinal centerline, as shown in FIG. 4.

Similarly, the output of the gear reduction 32L drives a rotary front shaft 32L, which is coupled to a rearwardly extending horizontal drive shaft 36L through a slip clutch CL identical to the slip clutch CR. Shaft 36L is located just to the left of the longitudinal centerline of the trailer.

The slip clutches CC and CR enable the towing vehicle to override the auxiliary propulsion mechanism without stripping the gears.

At their back ends the drive shafts 36R and 36L carry respective bevel gears 37R and 37L, which mesh with similar bevel gears 38R and 38L on the inner ends of horizontally disposed transverse drive shafts 39R and 39L, respectively. Shafts 39R and 39L are rotatably supported individually by cylindrical anti-friction bushings 40R and 40L. These bushings are rigidly supported by a cross beam 41 (FIG. 5) of hollow rectangular cross-section. Bushings 40R and 40L are above and in front of cross beam 41, which is in front of the axle A.

A short distance laterally inward from the drive wheel 42L (FIG. 8) the transverse drive shaft 39L is rotatably supported by a cylindrical anti-friction bushing 43L, which is rigidly attached to a horizontal, rearwardly extending, upper slide plate 44L, which is welded or otherwise rigidly attached to the top of the cross beam 41. As shown in FIG. 5, this upper slide plate slidably engages and passes over the flat top of the non-rotatable axle A. A lower slide plate 44'L (FIG. 9) is rigidly attached to the bottom of cross beam 41 and slidably engages the bottom of the axle A. Thus, the upper and lower slide plates 44L and 44'L guide this end of the cross beam 41 horizontally for movement longitudinally of the trailer toward and away from the non-rotatable axle A.

An identical arrangement is provided near the opposite end of cross beam 41 and axle A. Only the upper slide plate 44R and the anti-friction bushing 43R, but not the lower slide plate, appear in FIG. 4.

The cross beam 41 can be moved horizontally between its forward position, shown in FIG. 5, in which it is several inches in front of the axle A, and its retracted position, shown in FIG. 12, in which it abuts against the front of the axle A.

The cross beam 41 is rigidly attached, such as by welding, to the rear end of a horizontal beam 45, which extends along the longitudinal centerline of the trailer and passes a short distance below the longitudinal front piece 18 of the fixed frame of the trailer, as shown in FIG. 3. Diagonal brace rods 46R and 46L (FIG. 1) extend from the cross beam 41 near its opposite ends forward and laterally inward to the center beam 45 near its front end. The center beam 45, braces 46R and 46L and cross beam 41 together form a rigid frame that can be displaced horizontally a limited distance longitudinally of the fixed frame of the trailer.

The motor supporting shelf 26 is rigidly connected to the center beam 45 of the displaceable frame by plates 47R and 47L (FIG. 3), which are welded to the opposite sides of center beam 45 and extend up from it with a slight clearance on opposite sides of the front longitudinal piece 18 of the fixed frame of the trailer. Right-angled pieces 48R and 48L attach these plates 47R and 47L to the bottom of shelf 26. Thus, shelf 26 and motors 27R and 27L move in unison with the center beam 45 and the rest of the displaceable frame when it is displaced longitudinally of the fixed frame of the trailer.

The center beam 45 of the displaceable frame supports anti-friction bushings which rotatably support the drive shafts 36R and 36L at intervals along their length.

As shown in FIGS. 4, 6 and 7 (but omitted in FIG. 1 for simplicity) just behind the cross-piece 19 of the fixed frame of the trailer two anti-friction bushings 80R and 80L, through which the respective drive shifts 36R and 36L pass, are rigidly attached to the opposite sides of center beam 45. An ear 81 (FIG. 7) projects up from center beam 45 and is pivotally connected at 82 to the lower ends of a pair of linkage arms 83 and 84. The upper ends of these linkage arms are pivotally connected at 85 to the middle leg of a generally T-shaped bracket 86 that is bolted to the cross-piece 19 of the fixed frame. There is enough flexibility in the elongated center beam 45 and enough play in its pivotal linkage to the cross-piece 19 that the center beam 45 can move back and forth easily in response to operation of a handle H (FIGS. 2, 9 and 12) on the front end of the trailer.

As shown in FIG. 1, a similar arrangement may be provided just behind cross-piece 20 of the fixed frame. Here bushings 87R and 87L are rigidly attached to the center beam 45 of the displaceable frame, and beam 45 has the same type of pivotal linkage to cross-piece 20 as already described with reference to FIGS. 6 and 7.

As shown in FIG. 4, anti-friction bushings 91R and 91L are rigidly attached to the opposite sides of center beam 45 of the displaceable frame near its front end. These bushings are located just behind the collars 90R and 90L on the drive shafts 36R and 36L, respectively, and they rotatably support these drive shafts on the displaceable frame.

The position of the longitudinally shiftable frame is controlled by a handle H (FIGS. 9 and 12) having a rearwardly bent lower end segment 50 which extends at about 135 degrees to the remainder of the handle. A short distance behind its bend the handle is pivotally connected at 51 to the rear ends of a pair of closely spaced rigid linkage arm 52 whose front ends are pivotally connected at 53 to rigid ears 54 extending up from shelf 26. A connecting rod 55 extends rearward from the handle and is pivotally connected at 56 to the upper end of a rigid linkage arm 57. Near its lower end this linkage arm is pivotally connected at 58 to the center beam 45 of the longitudinally shiftable frame. About midway along its length the linkage arm 57 is pivotally mounted at 59 on the longitudinal front piece 18 of the fixed frame of the trailer.

FIG. 12 shows the handle H with its upper end extending more or less vertically up from the motor support shelf 26. In this position, the longitudinally displaceable frame is displaced rearward along the fixed frame of the trailer to the position in which its cross beam 41 abuts against the axle A. This is the inoperative position in which the drive wheels 42R and 42L of the trailer are not driven from the electric motors 27R and 27L, respectively.

When not in use the trailer can be stored with the handle H locked in its non-operating position, as shown in FIG. 12. The lower end of handle H is slidably disposed between two laterally spaced bars 70 and 71 (FIG. 13) which extend up from the shelf 26. As shown in FIG. 9, the handle is formed with a cross bore 72 which registers with corresponding openings 73 in bars 70 and 71 when the handle is raised to the position shown in FIG. 12. A locking pin 74 (FIG. 13) is slidably inserted through the bar openings 73 and the cross bore 72 in the handle to lock the handle in this position. This locking pin 74 has an enlarged head 75 on one end which is connected by a flexible bead chain 76 to the shelf 26, as shown in FIG. 12. A cotter pin 77 (FIG. 13) is inserted through a cross opening in the locking pin 74 near its opposite end to prevent its accidental withdrawal from the bar openings 73 and the cross bore 72 in the handle. This cotter pin can be removed when the user wants to be able to shift handle H to its operative position, shown in FIG. 9.

In this operative position of the handle H its upper end extends upward and forward at an angle of about 45 degrees to the horizontal. In this handle position the center beam 45 of the longitudinally displaceable frame is shifted forward along the fixed frame of the trailer to position its cross beam 41 spaced in front of the axle A, as shown in FIGS. 1 and 8. This is the operative position in which the electric motors 27R and 27L are coupled to the trailer drive wheels 42R and 42L, as explained hereinafter.

The drive from drive shaft 39L to trailer drive wheel 42L includes a small pinion gear 60L (FIGS. 8 and 10) on the outer end of drive shaft 39L and a chain 61L on the inside of the rim of this wheel. As shown in FIG. 11, alternate links of this chain are welded at 61w to the wheel rim.

An identical pinion gear (not shown) is on the outer end of the other drive shaft 39R, and it can mesh with a similar chain on the inside of the rim of drive wheel 42R.

When handle H is in its forward position (FIG. 9) the pinion gears on the outer ends of both transverse drive shafts 39L and 39R mesh with the respective chains on the rims of the corresponding drive wheels 42L and 42R. This is shown in FIGS. 8 and 9 for the drive wheel 42L.

When handle H is in its retracted position, as shown in FIG. 13, the pinion 60L is retracted rearward to a position disengaged from chain 61L on the inside of the rim of drive wheel 42L, as shown in that Figure. Also, the pinion on the outer end of the other drive shaft 39R is similarly disengaged from the chain mounted on the inside of the rim of drive wheel 42R.

I have found this pinion and chain drive arrangement to be exceptionally durable and trouble-free in operation particularly compared to a drive arrangement having meshing gears that tend to wear excessively or become damaged when brought into and out of engagement.

A locking pawl 62L is operatively associated with the pinion 60L to prevent the corresponding trailer drive wheel from rotating counterclockwise (i.e., backward) while this pinion is in driving engagement with the wheel chain 61L. This prevents the trailer from moving backward as it tends to do when a boat is being unloaded rearwardly from it into the water. The pawl 62L is operatively connected to a tightly wound helical spring 63L (FIG. 8) which permits the pawl to pivot counterclockwise but not clockwise in FIG. 10, so that the pinion 60L can rotate clockwise in that Figure to drive the wheel 42L in the forward direction but not in the rearward direction.

An identical arrangement (not shown) of a drive pinion on the outer end of drive shaft 39R, a chain on the inside of the rim of drive wheel 42R, and a locking pawl for this drive pinion is provided at the other drive wheel 42R.

In the particular embodiment shown, the trailer has a pair of ground-engaging rubber-tired idler, wheels 65R and 65L mounted on an axle 66 and located a short distance behind the drive wheels 42R and 42L. Axle 66 is rigidly connected to the rear side rails 10 and 11 of the fixed frame of the trailer. Wheels 65R and 65L roll on the ground and help support the weight of the trailer and the boat on it but they are not driven by the propulsion motors 27R and 27L for the trailer.

In the use of this trailer, when the trailer is being pulled by a vehicle the handle H is locked in its non-operating position (FIG. 12) by the locking pin 74 (FIG. 13) so that the drive pinions on the outer ends of the transverse drive shafts 39R and 39L are retracted rearwardly from engagement with the respective chains on the inside of wheels 42L and 42R. This is shown for pinion 60L and chain 61L on wheel 42L in FIG. 12.

After the trailer has been uncoupled from the pulling vehicle, the locking pin 74 is removed and the handle H is shifted from the non-operating position (FIG. 12) to the operative position (FIG. 9) in which the drive pinions on the outer ends of the transverse drive shafts 39R and 39L now are in driving engagement with the corresponding chains on wheels 42F and 42L. This is shown for the drive pinion 60L and the chain 62L on drive wheel 42L in FIG. 9. When the drive motors 27L and 27R are turned on, these pinions drive the respective wheels 42R and 42L rearward, enabling the trailer to back away from the towing vehicle and move easily over the ground as a self-powered vehicle to a position for launching the boat carried by the trailer in the water.

I claim:

1. In combination with a trailer having a pair of laterally spaced ground-engaging wheels on opposite sides of the trailer and means for releasably coupling the trailer to a pulling vehicle, an auxiliary propulsion system comprising:

battery-powered electric motor means on the trailer;
   drive means for operatively connecting said motor means to the ground-engaging wheels of the trailer for driving said wheels;
   means for selectively releasing said drive means to disconnect said ground-engaging wheels from said motor means when the trailer is to be pulled by a pulling vehicle;
   a fixed frame rotatably supporting said ground-engaging wheels and having means for attachment to the pulling vehicle;
   a displaceable frame carrying said electric motor means and said drive means and adjustable on said fixed frame between an inoperative position in which said drive means is released and an operative position in which said drive means operatively connects said motor means to the ground-engaging wheels of th trailer;
   and means for selectively positioning said displaceable frame on said fixed frame.

2. The combination of claim 1 wherein said drive means comprises:

a respective endless chain mounted on the inside of each of said ground-engaging wheels and extending in a circle around the axis of rotation of the respective wheel;
   and a respective pinion driven by said electric motor means and engageable with the corresponding chain to rotate the ground-engaging wheel which carries that chain in said operative position of said displaceable frame on said fixed frame, each pinion being disengaged from the corresponding chain in said inoperative position of the displaceable frame on the fixed frame.

3. The combination of claim 2 wherein:

said displaceable frame is slidable lengthwise of said fixed frame between said operative and inoperative positions.

4. The combination of claim 1 wherein:

said displaceable frame is slidable lengthwise of said fixed frame between said operative and inoperative positions.

5. The combination of claim 4 wherein said means for selectively positioning said displaceable frame comprises:

a handle mounted on said fixed frame near its front end;
   and a mechanical linkage acting between said handle and said displaceable frame to position said displaceable frame lengthwise of said fixed frame in accordance with the position of the handle.

6. The combination of claim 5 wherein said drive means comprises:

a respective endless chain mounted on the inside of each of said ground-engaging wheels and extending in a circle around the axis of rotation of the respective wheel;
   and a respective pinion driven by said electric motor means and engageable with the corresponding chain to rotate the corresponding ground-engaging wheel when said displaceable frame is in said operative position along said fixed frame, each pinion being disengaged from the corresponding chain when said displaceable frame is in said inoperative position along said fixed frame.

7. In combination with a trailer having a pair of laterally spaced ground-engaging wheels on opposite sides of the trailer and means for releasably coupling the trailer to a pulling vehicle, a auxiliary propulsion system comprising:

a battery-powered electric motor means on the trailer said motor means comprising two electric motors positioned on the trailer a substantial distance in front of said ground-engaging wheels;
   drive means for operatively connecting said motor means to the ground-engaging wheels of the trailer for driving said wheels, said drive means comprising a pair of longitudinal drive shafts driven individually by said motors and each extending from the respective motor rearward along the trailer, a pair of transverse drive shafts driven individually by said longitudinal drive shafts and extending laterally outward therefrom toward the corresponding wheel, a respective endless chain on the inside of each of said wheels and extending circularly around the axis of rotation of said wheel, and a respective pinion on the outer end of each of said transverse shafts drivingly engageable with the chain on the corresponding wheel to drive said wheel;
   means for selectively releasing said drive means to disconnect said ground-engaging wheels from said motor means when the trailer is to be pulled by a pulling vehicle;
   a fixed frame rotatably supporting said ground-engaging wheels and having means on its front end for attachment to the pulling vehicle;
   a displaceable frame carrying said motors and said longitudinal and transverse drive shafts, said displaceable frame being slidably adjustable lengthwise of said fixed frame between an inoperative position in which it holds said pinions out of driving engagement with the chains on the corresponding wheels and an operative position holding said pinions in driving engagement with the respective chains;

and means operatively connected to said displaceable frame to determine its position lengthwise of the fixed frame.

8. The combination of claim 7 wherein said means to position said displaceable frame comprises:
   a handle located near the front end of the trailer;
   and mechanical linkage means acting between said handle and said displaceable frame to position said displaceable frame lengthwise of the vehicle in accordance with the position of said handle.

9. In combination with a trailer having a pair of laterally spaced ground-engaging wheels on opposite sides of the trailer and means for releasably coupling the trailer to a pulling vehicle, an auxiliary propulsion system comprising:
   battery-powered electric motor means on the trailer, said motor means comprising two electric motors positioned on the trailer a substantial distance in front of said ground-engaging wheels;
   drive means for operatively connecting said motor means to the ground-engaging wheels of the trailer for driving said wheels, said drive means comprising a pair of longitudinal drive shafts driven individually by said motors and each extending from the respective motor rearward along the trailer, and a pair of transverse drive shafts drive individually by said longitudinal drive shafts and extending laterally outward therefrom toward the corresponding wheel;
   means for selectively releasing said drive means to disconnect said ground-engaging wheels from said motor means when the trailer is to be pulled by a pulling vehicle;
   a fixed rotatably supporting said ground-engaging wheels and having means on its front end for attachment to the pulling vehicle;
   a displaceable frame carrying said motors and said longitudinal and transverse drive shafts, said displaceable frame being slidably adjustable lengthwise of said frame between an operative position in which said transverse drive shafts are divingly coupled to the respective wheels and an inoperative position in which said transverse drive shafts are uncoupled from the respective wheels;
   and means operatively connected to said displaceable frame to determine its position lengthwise of said fixed frame.

10. The combination of claim 9 wherein said displaceable frame comprises:
    an elongated center beam extending along the longitudinal centerline of said fixed frame between said longitudinal drive shafts from said motors to said wheels;
    and anti-friction bearings carried by said center beam and rotatably supporting said longitudinal drive shafts at intervals along the length of each.

11. The combination of claim 10 and further comprising:
    a respective spring-engaged clutch acting between each motor and the corresponding longitudinal drive shaft.

12. In combination with a trailer having a pair of laterally spaced ground-engaging wheels on opposite sides of the trailer and means for releasably coupling the trailer to a pulling vehicle, an auxiliary propulsion system comprising:
    battery-powered electric motor means on the trailer, said motor means comprising two electric motors positioned on the trailer a substantial distance in front of said ground-engaging wheels;
    drive means for operatively connecting said motor means to the ground-engaging wheels of the trailer for driving said wheels, said drive means comprising a pair of longitudinal drive shafts driven individually by said motors and each extending from the respective motor rearward along the trailer, and a pair of transverse drive shafts drive individually by said longitudinal drive shafts and extending laterally outward therefrom toward the corresponding wheel;
    means for selectively releasing said drive means to disconnect said ground-engaging wheels from said motor means when the trailer is to be pulled by a pulling vehicle;
    and a respective spring-engaged clutch acting between each motor and the corresponding longitudinal drive shaft.

13. On a trailer having a ground-engaging wheel, the combination of:
    an endless chain mounted on said wheel and extending circularly around the axis of rotation of said wheel;
    a drive shaft extending transversely of the trailer at said wheel;
    a pinion on said drive shaft drivingly engageable with said chain on said wheel;
    means for driving said drive shaft to impart rotation to the wheel through said pinion and said chain;
    a fixed frame rotatably supporting said ground-engaging wheel;
    a displaceable frame carrying said drive shaft and adjustable on said fixed frame lengthwise of the trailer between an inoperative position holding said pinion out of engagement with said chain and an operative position holding said pinion in driving engagement with the chain;
    and means for selectively positioning said displaceable frame in said operative and inoperative positions.

14. The combination of claim 13 and further comprising:
    means operatively arranged to permit rotation of said drive shaft in one direction and prevent its rotation in the opposite direction.

15. The combination of claim 14 wherein said last-mentioned means comprises a pivoted pawl engaging said pinion.

* * * * *